(12) United States Patent
Tian et al.

(10) Patent No.: US 11,734,923 B2
(45) Date of Patent: Aug. 22, 2023

(54) METHOD FOR AUTOMATICALLY IDENTIFYING GLOBAL SOLAR PHOTOVOLTAIC (PV) PANELS BASED ON CLOUD PLATFORM BY USING REMOTE SENSING

(71) Applicant: Henan University, Kaifeng (CN)

(72) Inventors: Haifeng Tian, Kaifeng (CN); Jiajun Qiao, Kaifeng (CN); Yaochen Qin, Kaifeng (CN); Xiaohao Jiao, Kaifeng (CN); Shuai Wang, Kaifeng (CN)

(73) Assignee: Henan University, Kaifeng (CN)

( * ) Notice: Subject to any disclaimer, the term of this patent is extended or adjusted under 35 U.S.C. 154(b) by 0 days.

(21) Appl. No.: 18/099,280

(22) Filed: Jan. 20, 2023

(65) Prior Publication Data
US 2023/0237794 A1 Jul. 27, 2023

(30) Foreign Application Priority Data
Jan. 26, 2022 (CN) .................. 202210094492.X

(51) Int. Cl.
  *G06V 20/13* (2022.01)
  *G06V 10/60* (2022.01)
  *G06V 10/26* (2022.01)
  *G06V 10/143* (2022.01)
  *G06V 20/10* (2022.01)

(52) U.S. Cl.
  CPC ............ *G06V 20/13* (2022.01); *G06V 10/143* (2022.01); *G06V 10/273* (2022.01); *G06V 10/60* (2022.01); *G06V 20/176* (2022.01); *G06V 20/188* (2022.01)

(58) Field of Classification Search
  CPC ...... G06V 20/13; G06V 10/60; G06V 10/143; G06V 20/188; G06V 10/273; G06V 20/176
  See application file for complete search history.

(56) References Cited

U.S. PATENT DOCUMENTS

| 2013/0152998 A1* | 6/2013 | Herzig | G06F 30/20 |
| | | | 126/714 |
| 2016/0306906 A1* | 10/2016 | McBrearty | H02J 3/381 |
| 2017/0213390 A1* | 7/2017 | Ramachandran | G06F 3/03547 |
| 2018/0365746 A1* | 12/2018 | Nasle | G06Q 30/0641 |
| 2022/0077820 A1* | 3/2022 | Jeong | B64C 39/024 |

* cited by examiner

*Primary Examiner* — Syed Haider
(74) *Attorney, Agent, or Firm* — Bayramoglu Law Offices LLC

(57) ABSTRACT

A method for automatically identifying global solar photovoltaic (PV) panels based on a cloud platform by using remote sensing. Optical images in a study area for a whole specific year are collected based on the cloud platform, and preprocessing is performed to obtain a surface reflectance image. Seven time-series images are derived and constructed based on spectral features of a solar PV panel: a solar PV panel index image, a water index image, a vegetation index image, a difference image between a first shortwave infrared band and a second shortwave infrared band, a difference image between the first shortwave infrared band and a near-infrared band, a blue band image, and a first shortwave infrared band image. Data in the seven time-series images are synthesized and reconstructed to obtain input data required by a model. A remote sensing theoretical model for automatically identifying a solar PV panel is constructed.

5 Claims, 2 Drawing Sheets

METHOD FOR AUTOMATICALLY IDENTIFYING GLOBAL SOLAR PHOTOVOLTAIC (PV) PANELS BASED ON CLOUD PLATFORM BY USING REMOTE SENSING

CROSS-REFERENCE TO THE RELATED APPLICATION

This application is based upon and claims priority to Chinese Patent Application No. 202210094492.X filed on Jan. 26, 2022, the entire content of which is incorporated herein by reference.

TECHNICAL FIELD

The present disclosure relates to the technical field of object identification using remote sensing, and in particular, to a method for automatically identifying solar photovoltaic (PV) panels globally via a cloud platform by using remote sensing.

BACKGROUND

Peak carbon dioxide emission and carbon neutrality are keys to removing constraints on resources and environments. PV power generation is an important measure to implement green and clean energy production and to achieve the double carbon goals. Accurate data about the spatial distribution and scale of a PV power plant is essential for related departments and industrial decision-making. Remote sensing can be used to effectively obtain spatial distribution and scale of a PV power plant. However, spectral features obtained by using this method for a PV power plant may be fairly similar to other ground objects due to the impact of various factors, such as complex and heterogeneous layout environments, diversified layout scales, extensive distribution space, and the like of solar PV panels. As a result, the automatic identification of solar PV panels by using remote sensing is still unsatisfactory.

SUMMARY

To resolve the issue in the background, the present disclosure provides a method for automatically identifying solar PV panels globally via a cloud platform by using remote sensing. In this way, a spectral feature of the solar PV panel can be distinguished from that of another ground object. Therefore, the solar PV panel can be accurately and automatically identified.

The technical solutions of the present disclosure are implemented as follows.

A method for automatically identifying solar PV panels globally via a cloud platform by using remote sensing is provided, including the following steps:

S1: Landsat-8 optical satellite images of a whole specific year in a study area are collected via the cloud platform. Each of the Landsat-8 optical satellite images is preprocessed to obtain a set of surface reflectance images for the whole specific year.

S2: A solar PV panel remote sensing identification index is constructed based on a spectral feature of a solar PV panel, and a set of solar PV panel index images for the whole specific year is obtained through a calculation based on the solar PV panel remote sensing identification index and the set of surface reflectance images for the whole specific year obtained in S1.

S3: The set of solar PV panel index images for the whole specific year obtained in S2 is synthesized and reconstructed by using a quartile extraction algorithm, and an image at a third quartile in a reconstructed set of solar PV panel index images is selected as a solar PV panel index image that is for the specific year and that is to be inputted into a model.

S4: A set of water index images for the whole specific year and a set of vegetation index images for the whole specific year are obtained based on an existing water index, an existing vegetation index, and the set of surface reflectance images for the whole specific year obtained in S1.

S5: Each of the set of water index images for the whole specific year obtained in S4 and the set of vegetation index images for the whole specific year obtained in S4 are synthesized and reconstructed by using the quartile extraction algorithm. An image at a third quartile in a reconstructed set of water index images is selected as a water index image that is for the specific year and that is to be inputted into the model. An image at a third quartile in a reconstructed set of vegetation index images is selected as a vegetation index image that is for the specific year and that is to be inputted into the model.

S6: Through a calculation based on the set of surface reflectance images for the whole specific year obtained in S1, a set of difference images between a first shortwave infrared band and a second shortwave infrared band for the whole specific year and a set of difference images between the first shortwave infrared band and a near-infrared band for the whole specific year are obtained.

S7: By using the quartile extraction algorithm, each of the set of difference images between the first shortwave infrared band and the second shortwave infrared band for the whole specific year obtained in S6 and the set of difference images between the first shortwave infrared band and the near-infrared band for the whole specific year obtained in S6 are synthesized and reconstructed. An image at a first quartile in the set of difference images between the first shortwave infrared band and the second shortwave infrared band for the specific year is selected as a difference image that is to be inputted into the model is selected. An image at a first quartile in the set of difference images between the first shortwave infrared band and the near-infrared band for the specific year is selected as a difference image that is to be inputted to the model.

S8: By using the quartile extraction algorithm, each of a set of blue band images and a set of first shortwave infrared band images in the set of surface reflectance images for the whole specific year obtained in S1 is synthesized and reconstructed. An image at a third quartile in a reconstructed set of blue band images is selected as a blue band image that is for the specific year and that is to be inputted into the model. An image at a third quartile in a reconstructed set of first shortwave infrared band images is selected as a first shortwave infrared band image that is for the specific year and that is to be inputted into the model.

S9: A topographic slope image of the study area is obtained through a calculation based on digital elevation model (DEM) data of the study area aggregated by the cloud platform.

S10: A blank image is constructed, where spatial resolution equals a spatial resolution of a model input image and quantities of pixel rows and pixel columns equal quantities of pixel rows and pixel columns of the model input image; the blank image is defined as an identification result image.

S11: If a pixel value at an $i^{th}$ pixel location in the solar PV panel index image for the specific year obtained in S3 is greater than a threshold $\alpha$, S12 is performed. If a pixel value at an $i^{th}$ pixel location in the solar PV panel index image for the specific year obtained in S3 is less than or equal to a threshold α, S13 is performed.

S12: A pixel at an $i^{th}$ pixel location in the identification result image is determined to indicate a solar PV panel if a pixel value at an $i^{th}$ pixel location in the water index image for the specific year obtained in S5 is less than a threshold β. A pixel at an $i^{th}$ pixel location in the identification result image is determined to indicate another ground object if a pixel value at an $i^{th}$ pixel location in the water index image for the specific year obtained in S5 is greater than or equal to a threshold δ.

S13: S14 is performed if the pixel value at the $i^{th}$ pixel location in the solar PV panel index image for the specific year obtained in S3 is greater than a threshold γ and a pixel value at an $i^{th}$ pixel location in the water index image for the specific year obtained in S5 is less than a threshold β. Otherwise, a pixel at an $i^{th}$ pixel location in the identification result image is determined to indicate another ground object.

S14: S16 is performed if a pixel value at an $i^{th}$ pixel location in the vegetation index image for the specific year obtained in S5 is less than a threshold δ, or S15 is performed if a pixel value at an $i^{th}$ pixel location in the vegetation index image for the specific year obtained in S5 is greater than or equal to a threshold δ.

S15: A pixel at an $i^{th}$ pixel location in the identification result image is determined to indicate a solar PV panel if a difference between the pixel value at the $i^{th}$ pixel location in the vegetation index image and the pixel value at the $i^{th}$ pixel location in the solar PV panel index image is less than a difference between the threshold δ and the threshold β. A pixel at an $i^{th}$ pixel location in the identification result image is determined to indicate another ground object if a difference between the pixel value at the $i^{th}$ pixel location in the vegetation index image and the pixel value at the $i^{th}$ pixel location in the solar PV panel index image is greater than or equal to a difference between the threshold δ and the threshold β.

S16: S17 is performed if a pixel value at an $i^{th}$ pixel location in the topographic slope image obtained in S9 is less than a threshold ε, a pixel value at an $i^{th}$ pixel location in the first shortwave infrared band image obtained in S8 falls within a range (η, ζ), and a pixel value at an $i^{th}$ pixel location in the blue band image obtained in S8 is less than a threshold θ. A pixel at an $i^{th}$ pixel location in the identification result image is determined to indicate another ground object if a pixel value at an $i^{th}$ pixel location in the topographic slope image obtained in S9 is greater than or equal to a threshold ε, a pixel value at an $i^{th}$ pixel location in the first shortwave infrared band image obtained in S8 does not fall within a range (η, ζ), and/or a pixel value at an $i^{th}$ pixel location in the blue band image obtained in S8 is greater than or equal to a threshold θ.

S17: A pixel at an $i^{th}$ pixel location in the identification result image is determined to indicate a solar PV panel if a pixel value at an $i^{th}$ pixel location in the difference image between the first shortwave infrared band and the second shortwave infrared band obtained in S7 is greater than a threshold t and a pixel value at an $i^{th}$ pixel location in the difference image between the first shortwave infrared band and the near-infrared band obtained in S7 is greater than a threshold κ. A pixel at an $i^{th}$ pixel location in the identification result image is determined to indicate another ground object if a pixel value at an $i^{th}$ pixel location in the difference image between the first shortwave infrared band and the second shortwave infrared band obtained in S7 is less than or equal to a threshold τ, and/or a pixel value at an $i^{th}$ pixel location in the difference image between the first shortwave infrared band and the near-infrared band obtained in S7 is less than or equal to a threshold κ.

S18: S11 to S17 is repeated until pixel locations in the study area are all traversed to complete automatic identification of the solar PV panel in the study area by using remote sensing.

Preferably, the preprocessing of each of the Landsat-8 optical satellite images includes removing a cloud impact and correcting surface reflectance.

The surface reflectance is corrected by multiplying each pixel value in the Landsat-8 optical satellite image by a correction factor of 0.0000275 and subtracting 0.2 from a value that is obtained after multiplication to obtain a surface reflectance image of the Landsat-8 optical satellite image.

The cloud impact is removed by changing a pixel value at an $i^{th}$ pixel location on each band in a data quality control image to null if the pixel value at the $i^{th}$ pixel location in the data quality control image equals 3 or 4, where each Landsat-8 optical satellite image comprises the data quality control image, and a pixel in the data quality control image indicates a cloud if a value of the pixel equals 3 and a cloud shadow if the value of the pixel equals 4.

Preferably, the solar PV panel remote sensing identification index is constructed by using the following formula:

$$SPI_i = \frac{2 \times X_{swir1,i} - (X_{swir2,i} + X_{nir,i}) - |X_{nir,i} - X_{red,i}| - |X_{nir,i} - X_{swir2,i}|}{2 \times X_{swir1,i} + (X_{swir2,i} + X_{nir,i})},$$

where $SPI_i$ represents a solar PV panel index at an $i^{th}$ pixel location in a solar PV panel index image, $X_{swir1,i}$ represents surface reflectance at an $i^{th}$ pixel location on the first shortwave infrared band in a surface reflectance image, $X_{swir2,i}$ represents surface reflectance at an $i^{th}$ pixel location on the second shortwave infrared band in the surface reflectance image, $X_{nir,i}$ represents surface reflectance at an $i^{th}$ pixel location on the near-infrared band in the surface reflectance image, and $X_{red,i}$ represents surface reflectance at an $i^{th}$ pixel location on a red band in the surface reflectance image, where i=1.2, . . . , n, and n represents a total quantity of pixels in the surface reflectance image.

Preferably, S3 specifically comprises the following steps: sorting values of solar PV panel indexes for the whole specific year by pixel, resorting values of N solar PV panel indexes at an $i^{th}$ pixel location in ascending order, extracting a value at a third quartile as a pixel value at the $i^{th}$ pixel location, and traversing all pixel locations to obtain the solar PV panel index image that is for the specific year and that is to be inputted to the model.

Preferably, the water index and the vegetation index are obtained by using the following formulas:

$$WI_i = (X_{green,i} - X_{swir1,i})/(X_{green,i} + X_{swir1,i}),$$

$$VI_i = (X_{nir,i} - X_{red,i})/(X_{nir,i} + X_{red,i}),$$

wherein $WI_i$ represents a water index at an $i^{th}$ pixel location in a water index image, $VI_i$ represents a vegetation index at an $i^{th}$ pixel location in a vegetation index image, and $X_{green,i}$ represents surface reflectance at an $i^{th}$ pixel location on a green band in the surface reflectance image.

Preferably, the threshold α is determined based on the following steps: collecting samples of a solar PV panel and another ground object, obtaining a distribution range of pixel values for the solar PV panel in the solar PV panel index image obtained in S3 and a distribution range of pixel values for a ground object that is not the solar PV panel in the solar PV panel index image obtained in S3, and using a maximum value in the distribution range of pixel values for the ground object that is not the solar PV panel as the threshold α.

Compared with the prior art, the present disclosure has the following beneficial effects:

1. The present disclosure proposes a solar PV panel remote sensing index that is based on an optical satellite image, namely, a solar panel index (SPI). This provides a theoretical basis for identifying a solar PV panel by using remote sensing.

2. The present disclosure creates a model for automatically identifying a solar PV panel by using remote sensing. The model takes full advantage of the spectral features of a solar PV panel and can be used to accurately and automatically identify the distribution information of the solar PV panel.

BRIEF DESCRIPTION OF THE DRAWINGS

To describe the technical solutions in the embodiments of the present disclosure or the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The technical solutions of the embodiments of the present disclosure are clearly and completely described below by referring to the accompanying drawings. The described embodiments are merely a part, rather than all, of the embodiments of the present disclosure. All other embodiments obtained by those of ordinary skill in the art based on the embodiments of the present disclosure without creative efforts should fall within the protection scope of the present disclosure.

Figure 1:
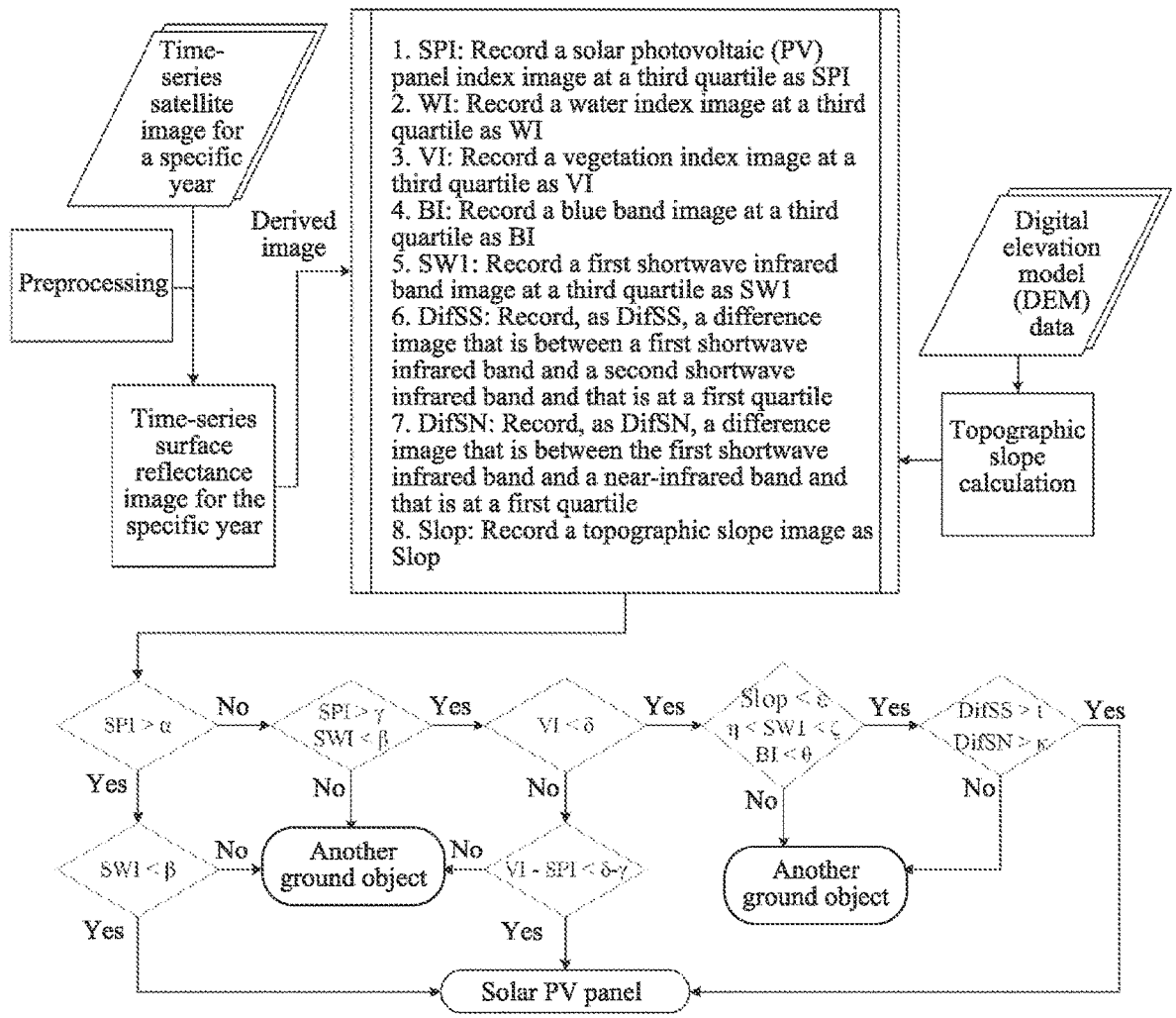
FIG. 1 is a flowchart of the present disclosure.

Referring to FIG. 1, an embodiment of the present disclosure provides a method for automatically identifying solar PV panels globally via a cloud platform by using remote sensing. Specifically, the method includes the following steps:

S1: The Longyangxia PV plant in the Qinghai province of China is used as a study area. A number (e.g., 45) of Landsat-8 optical satellite images in the study area for the whole year of 2021 are collected based on the cloud platform. Preprocessing operations such as cloud impact removal and surface reflectance correction are performed on each of the optical satellite images to obtain a set of surface reflectance images for the whole year of 2021.

Each Landsat-8 optical satellite image includes a data quality control image, and a pixel in the data quality control image indicates a cloud if the value of the pixel equals 3 and a cloud shadow if the value of the pixel equals 4. Therefore, a cloud impact can be removed by changing a pixel value at an $i^{th}$ pixel location on each band in the data quality control image to null if the pixel value at the $i^{th}$ pixel location in the data quality control image equals 3 or 4.

Surface reflectance can be corrected by multiplying each pixel value in the Landsat-8 optical satellite image by a correction factor of 0.0000275 and subtracting 0.2 from the value that is obtained after multiplication. In this way, a surface reflectance image of the Landsat-8 optical satellite image can be obtained. Each Landsat-8 optical satellite image includes six band images: a blue band reflectance image, a green band reflectance image, a red band reflectance image, a near-infrared band reflectance image, a first shortwave infrared band reflectance image, and a second shortwave infrared band reflectance image.

S2: A number (e.g., 3216) of pixel samples are analyzed to obtain spectral features of solar PV panels in the Landsat-8 optical satellite images. A solar PV panel remote sensing identification index is constructed based on the spectral features of the solar PV panels. A set of solar PV panel index images for the whole year of 2021 is obtained through a calculation based on the solar PV panel remote sensing identification index and the set of surface reflectance images for the whole year of 2021 obtained in S1.

The solar PV panel remote sensing identification index is constructed by using the following formula:

$$SPI_i = \frac{2 \times X_{swir1,i} - (X_{swir2,i} + X_{nir,i}) - |X_{nir,i} - X_{red,i}| - |X_{nir,i} - X_{swir2,i}|}{2 \times X_{swir1,i} + (X_{swir2,i} + X_{nir,i})}$$

$SPI_i$ represents a solar PV panel index at an $i^{th}$ pixel location in a solar PV panel index image. $X_{swir1,i}$ represents surface reflectance at an $i^{th}$ pixel location on a first shortwave infrared band in a surface reflectance image. $X_{swir2,i}$ represents surface reflectance at an $i^{th}$ pixel location on a second shortwave infrared band in the surface reflectance image. $X_{nir,i}$ represents surface reflectance at an $i^{th}$ pixel location on a near-infrared band in the surface reflectance image. $X_{red,i}$ represents surface reflectance at an $i^{th}$ pixel location on a red band in the surface reflectance image, and i=1,2, . . . ,n, n represents a total quantity of pixels in the surface reflectance image.

S3: A quartile extraction algorithm is used to synthesize and reconstruct the set of solar PV panel index images for the whole year of 2021 obtained in S2, and an image at a third quartile in a reconstructed set of solar PV panel index images is selected as a solar PV panel index image of 2021 to be inputted into a model.

S3 specifically comprises the following steps: Values of solar PV panel indexes for the whole year of 2021 are sorted by pixel. Values of N solar PV panel indexes at an $i^{th}$ pixel location are resorted in ascending order. A value at a third quartile is extracted as a pixel value at the $i^{th}$ pixel location. All pixel locations are traversed. In this way, the solar PV panel index image of 2021 to be inputted into the model is obtained.

S4: A set of water index images for the whole year of 2021 and a set of vegetation index images for the whole year of 2021 are obtained through a calculation based on an existing water index, an existing vegetation index, and the set of surface reflectance images for the whole year of 2021 obtained in S1. The water index and the vegetation index are obtained by using the following formulas:

$$WI_i = (X_{green,i} - X_{swir1,i})/(X_{green,i} + X_{swir1,i})$$

$$VI_i = (X_{nir,i} - X_{red,i})/(X_{nir,i} + X_{red,i})$$

$WI_i$ represents a water index at an $i^{th}$ pixel location in a water index image. $VI_i$ represents a vegetation index at an $i^{th}$ pixel location in a vegetation index image. $X_{green,i}$ represents surface reflectance at an $i^{th}$ pixel location on a green band in the surface reflectance image.

S5: The quartile extraction algorithm is used to synthesize and reconstruct each of the set of water index images for the whole year of 2021 obtained in S4 and the set of vegetation index images for the whole year of 2021 obtained in S4. An image at a third quartile in a reconstructed set of water index images is selected as a water index image of 2021 to be inputted into the model, and an image at a third quartile in a reconstructed set of vegetation index images is selected as a vegetation index image of 2021 to be inputted into the model.

S6: A set of difference images between the first shortwave infrared band and the second shortwave infrared band for the whole year of 2021 and a set of difference images between the first shortwave infrared band and the near-infrared band for the whole year of 2021 are obtained through a calculation based on the set of surface reflectance images for the whole year of 2021 obtained in S1.

S7: The quartile extraction algorithm is used to synthesize and reconstruct each of the set of difference images between the first shortwave infrared band and the second shortwave infrared band for the whole year of 2021 obtained in S6 and the set of difference images between the first shortwave infrared band and the near-infrared band for the whole year of 2021 obtained in S6. An image at a first quartile in the set of difference images between the first shortwave infrared band and the second shortwave infrared band for 2021 is selected as a difference image that is to be inputted into the model. An image at a first quartile in the set of difference images between the first shortwave infrared band and the near-infrared band for 2021 is selected as a difference image that is to be inputted into the model.

S8: The quartile extraction algorithm is used to synthesize and reconstruct each of a set of blue band images and a set of first shortwave infrared band images in the set of surface reflectance images for the whole year of 2021 obtained in S1. An image at a third quartile in a reconstructed set of blue band images is selected as a blue band image of 2021 to be inputted into the model, and an image at a third quartile in a reconstructed set of first shortwave infrared band images is selected as a first shortwave infrared band image of 2021 to be inputted into the model.

S9: A topographic slope image of the study area is obtained through a calculation based on DEM data of the study area aggregated by the cloud platform.

S10: A blank image is constructed, where spatial resolution equals that of a model input image and quantities of pixel rows and pixel columns equal those of the model input image, and the blank image is defined as an identification result image. Model input images obtained in the foregoing steps have the same spatial resolutions and the same quantities of pixel rows and pixel columns.

S11: S12 is performed if a pixel value at an $i^{th}$ pixel location in the solar PV panel index image of 2021 obtained in S3 is greater than a threshold $\alpha$. Alternatively, S13 is performed if a pixel value at an $i^{th}$ pixel location in the solar PV panel index image of 2021 obtained in S3 is less than or equal to a threshold $\alpha$. The threshold $\alpha$ is determined based on the following steps: Samples of a solar PV panel and another ground object are collected. A distribution range of pixel values for the solar PV panel in the solar PV panel index image obtained in S3 and a distribution range of pixel values for another ground object in the solar PV panel index image obtained in S3 is obtained. A maximum value in the distribution range of pixel values for another ground object is used as the threshold $\alpha$. In this embodiment, $\alpha=0.3$.

S12: It is determined that a pixel at an $i^{th}$ pixel location in the identification result image indicates a solar PV panel if a pixel value at an $i^{th}$ pixel location in the water index image of 2021 obtained in S5 is less than a threshold $\beta$. Alternatively, it is determined that a pixel at an $i^{th}$ pixel location in the identification result image indicates another ground object if a pixel value at an $i^{th}$ pixel location in the water index image of 2021 obtained in S5 is greater than or equal to a threshold $\beta$. In this embodiment, $\beta=0$.

S13: S14 is performed if the pixel value at the $i^{th}$ pixel location in the solar PV panel index image of 2021 obtained in S3 is greater than a threshold $\gamma$ and a pixel value at an $i^{th}$ pixel location in the water index image of 2021 obtained in S5 is less than the threshold $\beta$. Otherwise, it is determined that a pixel at an $i^{th}$ pixel location in the identification result image indicates another ground object. In this embodiment, $\gamma=0.08$.

S14: S16 is performed if a pixel value at an $i^{th}$ pixel location in the vegetation index image of 2021 obtained in S5 is less than a threshold $\delta$. Alternatively, S15 is performed if a pixel value at an $i^{th}$ pixel location in the vegetation index image of 2021 obtained in S5 is greater than or equal to a threshold $\delta$. In this embodiment, $\delta=0.39$.

S15: It is determined that a pixel at an $i^{th}$ pixel location in the identification result image indicates a solar PV panel if a difference between the pixel value at the $i^1$ pixel location in the vegetation index image and the pixel value at the $i^{th}$ pixel location in the solar PV panel index image is less than a difference between the threshold $\delta$ and the threshold $\beta$. Alternatively, it is determined that a pixel at an $i^{th}$ pixel location in the identification result image indicates another ground object if a difference between the pixel value at the $i^{th}$ pixel location in the vegetation index image and the pixel value at the $i^{th}$ pixel location in the solar PV panel index image is greater than or equal to a difference between the threshold $\delta$ and the threshold $\beta$.

S16: S17 is performed if a pixel value at an $i^{th}$ pixel location in the topographic slope image obtained in S9 is less than a threshold $\varepsilon$, a pixel value at an $i^{th}$ pixel location in the first shortwave infrared band image obtained in S8 falls within a range $(\eta, \zeta)$, and a pixel value at an $i^{th}$ pixel location in the blue band image obtained in S8 is less than a threshold $\theta$. Alternatively, it is determined that a pixel at an $i^{th}$ pixel location in the identification result image indicates another ground object if a pixel value at an $i^{th}$ pixel location in the topographic slope image obtained in S9 is greater than or equal to a threshold $\varepsilon$, a pixel value at an $i^{th}$ pixel location in the first shortwave infrared band image obtained in S8 does not fall within a range $(\eta, \zeta)$, and/or a pixel value at an $i^{th}$ pixel location in the blue band image obtained in S8 is greater than or equal to a threshold $\theta$. In this embodiment, $\varepsilon=12$, $\eta=0.09$, $\zeta=0.34$, and $\theta=0.14$.

S17: It is determined that a pixel at an $i^{th}$ pixel location in the identification result image indicates a solar PV panel if a pixel value at an $i^{th}$ pixel location in the difference image between the first shortwave infrared band and the second shortwave infrared band obtained in S7 is greater than a threshold $\tau$ and a pixel value at an $i^{th}$ pixel location in the difference image between the first shortwave infrared band and the near-infrared band obtained in S7 is greater than a threshold $\kappa$. Alternatively, it is determined that a pixel at an $i^{th}$ pixel location in the identification result image indicates another ground object if a pixel value at an $i^{th}$ pixel location in the difference image between the first shortwave infrared band and the second shortwave infrared band obtained in S7 is less than or equal to a threshold $\tau$, and/or a pixel value at an $i^{th}$ pixel location in the difference image between the first shortwave infrared band and the near-infrared band obtained in S7 is less than or equal to a threshold κ. In this embodiment, τ=0.03 and κ=0.

S18: S11 to S17 are repeated until pixel locations in the study area are all traversed to complete the automatic identification of solar PV panels in the study area by using remote sensing.

Figure 2:
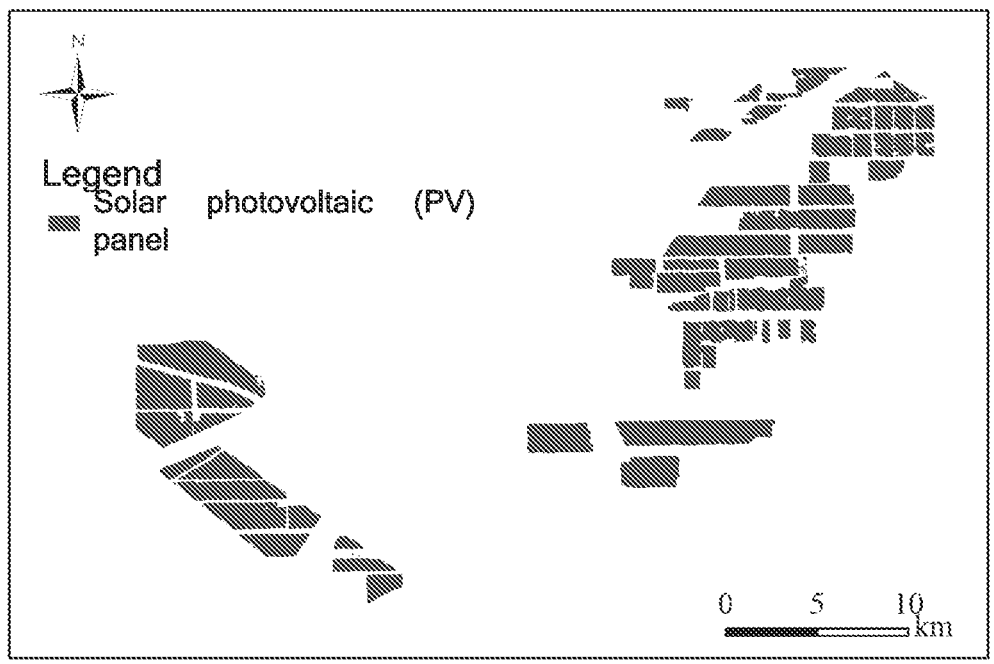
FIG. 2 shows a result of identifying a solar PV panel in the present disclosure.

To verify the effect of the present disclosure, the Longyangxia PV plant in the Qinghai province of China in 2021 is used as the study area and Landsat-8 optical satellite images are collected. FIG. 2 shows an identification result. FIG. 2 shows that texture information, such as boundary information, of the Longyangxia PV plant is complete and a solar PV panel is effectively distinguished from another ground object such as a road. This proves that the present disclosure can be used to reliably and accurately identify a solar PV panel.

The above described are merely preferred embodiments of the present disclosure and are not intended to limit the present disclosure. Any modifications, equivalent replacements, and improvements made within the spirit and principle of the present disclosure should all fall within the scope of protection of the present disclosure.

What is claimed is:

1. A method for automatically identifying solar photovoltaic (PV) panels globally via a cloud platform by using remote sensing, comprising the following steps:

S1: collecting Landsat-8 optical satellite images in a study area for a specific year based on the cloud platform and preprocessing each of the Landsat-8 optical satellite images to obtain a set of surface reflectance images for the specific year;

S2: constructing a solar PV panel remote sensing identification index based on a spectral feature of a solar PV panel and obtaining a set of solar PV panel index images for the specific year through a calculation based on the solar PV panel remote sensing identification index and the set of surface reflectance images for the specific year obtained in S1;

S3: synthesizing and reconstructing, by using a quartile extraction algorithm, the set of solar PV panel index images for the specific year obtained in S2 and selecting an image at a third quartile in a reconstructed set of solar PV panel index images as a solar PV panel index image that is for the specific year and that is to be inputted into a model;

S4: obtaining a set of water index images for the specific year and a set of vegetation index images for the specific year based on an existing water index, an existing vegetation index, and the set of surface reflectance images for the specific year obtained in S1;

S5: synthesizing and reconstructing, by using the quartile extraction algorithm, each of the set of water index images for the specific year obtained in S4 and the set of vegetation index images for the specific year obtained in S4; and selecting an image at a third quartile in a reconstructed set of water index images as a water index image that is for the specific year and that is to be inputted into the model, and an image at a third quartile in a reconstructed set of vegetation index images as a vegetation index image that is for the specific year and that is to be inputted into the model;

S6: obtaining, through a calculation based on the set of surface reflectance images for the specific year obtained in S1, a set of difference images between a first shortwave infrared band and a second shortwave infrared band for the specific year and a set of difference images between the first shortwave infrared band and a near-infrared band for the specific year;

S7: synthesizing and reconstructing, by using the quartile extraction algorithm, each of the set of difference images obtained in S6 between the first shortwave infrared band and the second shortwave infrared band for the specific year and the set of difference images obtained in S6 between the first shortwave infrared band and the near-infrared band for the specific year; and selecting an image at a first quartile in the set of difference images between the first shortwave infrared band and the second shortwave infrared band for the specific year as a difference image that is to be inputted into the model, and an image at a first quartile in the set of difference images between the first shortwave infrared band and the near-infrared band for the specific year as a difference image that is to be inputted to the model;

S8: synthesizing and reconstructing, by using the quartile extraction algorithm, each of a set of blue band images and a set of first shortwave infrared band images in the set of surface reflectance images for the specific year obtained in S1; and selecting an image at a third quartile in a reconstructed set of blue band images as a blue band image that is for the specific year and that is to be inputted into the model, and an image at a third quartile in a reconstructed set of first shortwave infrared band images as a first shortwave infrared band image that is for the specific year and that is to be inputted into the model;

S9: obtaining a topographic slope image of the study area through a calculation based on digital elevation model data of the study area aggregated by the cloud platform;

S10: constructing a blank image whose spatial resolution equals a spatial resolution of a model input image and quantities of pixel rows and pixel columns equal quantities of pixel rows and pixel columns of the model input image and defining the blank image as an identification result image;

S11: performing S12 if a pixel value at an $i^{th}$ pixel location in the solar PV panel index image for the specific year obtained in S3 is greater than a threshold α or performing S13 if a pixel value at an $i^{th}$ pixel location in the solar PV panel index image for the specific year obtained in S3 is less than or equal to a threshold α;

S12: determining that a pixel at an $i^{th}$ pixel location in the identification result image indicates a solar PV panel if a pixel value at an $i^{th}$ pixel location in the water index image for the specific year obtained in S5 is less than a threshold β or determining that a pixel at an $i^{th}$ pixel location in the identification result image indicates another ground object if a pixel value at an $i^{th}$ pixel location in the water index image for the specific year obtained in S5 is greater than or equal to a threshold β;

S13: performing S14 if the pixel value at the $i^{th}$ pixel location in the solar PV panel index image for the specific year obtained in S3 is greater than a threshold γ and a pixel value at an $i^{th}$ pixel location in the water index image for the specific year obtained in S5 is less than a threshold β; otherwise, determining that a pixel at an $i^{th}$ pixel location in the identification result image indicates another ground object;

S14: performing S16 if a pixel value at an $i^{th}$ pixel location in the vegetation index image for the specific year obtained in S5 is less than a threshold δ or performing S15 if a pixel value at an $i^{th}$ pixel location in the vegetation index image for the specific year obtained in S5 is greater than or equal to a threshold δ;

S15: determining that a pixel at an $i^{th}$ pixel location in the identification result image indicates a solar PV panel if a difference between the pixel value at the $i^{th}$ pixel location in the vegetation index image and the pixel value at the $i^{th}$ pixel location in the solar PV panel index image is less than a difference between the threshold $\delta$ and the threshold $\beta$, or determining that a pixel at an $i^{th}$ pixel location in the identification result image indicates another ground object if a difference between the pixel value at the $i^{th}$ pixel location in the vegetation index image and the pixel value at the $i^{th}$ pixel location in the solar PV panel index image is greater than or equal to a difference between the threshold $\delta$ and the threshold $\beta$;

S16: performing S17 if a pixel value at an $i^{th}$ pixel location in the topographic slope image obtained in S9 is less than a threshold $\varepsilon$, a pixel value at an $i^{th}$ pixel location in the first shortwave infrared band image obtained in S8 falls within a range $(\eta, \zeta)$, and a pixel value at an $i^{th}$ pixel location in the blue band image obtained in S8 is less than a threshold $\theta$; or determining that a pixel at an $i^{th}$ pixel location in the identification result image indicates another ground object if a pixel value at an $i^{th}$ pixel location in the topographic slope image obtained in S9 is greater than or equal to a threshold $\varepsilon$, a pixel value at an $i^{th}$ pixel location in the first shortwave infrared band image obtained in S8 does not fall within a range $(\eta, \zeta)$, and/or a pixel value at an $i^{th}$ pixel location in the blue band image obtained in S8 is greater than or equal to a threshold $\theta$;

S17: determining that a pixel at an $i^{th}$ pixel location in the identification result image indicates a solar PV panel if a pixel value at an $i^{th}$ pixel location in the difference image, obtained in S7, between the first shortwave infrared band and the second shortwave infrared band is greater than a threshold $\tau$ and a pixel value at an $i^{th}$ pixel location in the difference image, obtained in S7, between the first shortwave infrared band and the near-infrared band is greater than a threshold $\kappa$; or determining that a pixel at an $i^{th}$ pixel location in the identification result image indicates another ground object if a pixel value at an $i^{th}$ pixel location in the difference image, obtained in S7, between the first shortwave infrared band and the second shortwave infrared band is less than or equal to a threshold $\tau$, and/or a pixel value at an $i^{th}$ pixel location in the difference image, obtained in S7, between the first shortwave infrared band and the near-infrared band is less than or equal to a threshold $\kappa$; and S18: repeating S11 to S17 until pixel locations in the study area are all traversed to complete automatic identification of the solar PV panel in the study area by using the remote sensing.

2. The method for automatically identifying the solar PV panels globally via the cloud platform by using the remote sensing according to claim 1, wherein the preprocessing of each of the Landsat-8 optical satellite images comprises removing a cloud impact and correcting surface reflectance, wherein the surface reflectance is corrected by multiplying each pixel value in the Landsat-8 optical satellite image by a correction factor of 0.0000275 and subtracting 0.2 from a value that is obtained after multiplication to obtain a surface reflectance image of the Landsat-8 optical satellite image; and the cloud impact is removed by changing a pixel value at an $i^{th}$ pixel location on each band in a data quality control image to null if the pixel value at the $i^{th}$ pixel location in the data quality control image equals 3 or 4, wherein each Landsat-8 optical satellite image comprises the data quality control image, and a pixel in the data quality control image indicates a cloud if a value of the pixel equals 3 and a cloud shadow if the value of the pixel equals 4.

3. The method for automatically identifying the solar PV panels globally via the cloud platform by using the remote sensing according to claim 1, wherein S3 specifically comprises the following steps: sorting values of solar PV panel indexes for the whole specific year by pixel, resorting values of N solar PV panel indexes at an $i^{th}$ pixel location in ascending order, extracting a value at the third quartile as a pixel value at the $i^{th}$ pixel location, and traversing all pixel locations to obtain the solar PV panel index image that is for the specific year and that is to be inputted to the model.

4. The method for automatically identifying the solar PV panels globally via the cloud platform by using the remote sensing according to claim 1, wherein the water index and the vegetation index are obtained by using the following formulas:

$$WI_i = (X_{green,i} - X_{swir1,i})/(X_{green,i} + X_{swir1,i}),$$

$$VI_i = (X_{nir,i} - X_{red,i})/(X_{nir,i} + X_{red,i}),$$

wherein $WI_i$ represents a water index at an $i^{th}$ pixel location in a water index image, $VI_i$ represents a vegetation index at an $i^{th}$ pixel location in a vegetation index image, and $X_{green,i}$ represents surface reflectance at an $i^1$ pixel location on a green band in the surface reflectance image.

5. The method for automatically identifying the solar PV panels globally via the cloud platform by using the remote sensing according to claim 1, wherein the threshold $\alpha$ is determined based on the following steps: collecting samples of the solar PV panel and another ground object, obtaining a distribution range of pixel values for the solar PV panel in the solar PV panel index image obtained in S3 and a distribution range of pixel values for a ground object that is not the solar PV panel in the solar PV panel index image obtained in S3, and using a maximum value in the distribution range of pixel values for the ground object that is not the solar PV panel as the threshold $\alpha$.

* * * * *